US008428194B2

(12) United States Patent
Kuo et al.

(10) Patent No.: US 8,428,194 B2
(45) Date of Patent: Apr. 23, 2013

(54) IN-SITU GAIN CALIBRATION OF RADIO FREQUENCY DEVICES USING THERMAL NOISE

(75) Inventors: Timothy C. Kuo, Cupertino, CA (US); Mansour Keramat, San Jose, CA (US); Edward Wai Yeung Liu, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/399,971

(22) Filed: Feb. 17, 2012

(65) Prior Publication Data

US 2012/0149322 A1    Jun. 14, 2012

Related U.S. Application Data

(62) Division of application No. 12/173,166, filed on Jul. 15, 2008, now Pat. No. 8,121,221, which is a division of application No. 11/132,509, filed on May 18, 2005, now Pat. No. 7,447,490.

(51) Int. Cl.
*H03K 9/00* (2006.01)
*H04L 27/00* (2006.01)

(52) U.S. Cl.
USPC .......................................................... 375/316

(58) Field of Classification Search .................... 375/316
See application file for complete search history.

(56) References Cited

U.S. PATENT DOCUMENTS

| 5,758,271 | A | * | 5/1998 | Rich et al. ................... 455/234.1 |
| 6,064,655 | A | | 5/2000 | Murphy |
| 6,678,509 | B2 | | 1/2004 | Skarman et al. |
| 6,690,915 | B1 | | 2/2004 | Ito et al. |
| 2001/0012770 | A1 | | 8/2001 | Pol |
| 2005/0079842 | A1 | | 4/2005 | Shi |
| 2005/0227627 | A1 | | 10/2005 | Cyr et al. |
| 2005/0260963 | A1 | * | 11/2005 | Ponce De Leon et al. . 455/226.3 |

FOREIGN PATENT DOCUMENTS

| JP | 2003234628 A2 | 8/2003 |
| JP | 2004056540 A2 | 2/2004 |
| JP | 2004336470 A2 | 11/2004 |

OTHER PUBLICATIONS

European Search Report issued to EP Application No. 06010272.0, Aug. 18, 2008, 6 pgs.
Le, Restriction Office Action issued to U.S. Appl. No. 11/132,509, Jan. 4, 2008, 6 pgs.

(Continued)

*Primary Examiner* — David C. Payne
*Assistant Examiner* — Tanmay Shah
(74) *Attorney, Agent, or Firm* — Cooley LLP

(57) ABSTRACT

An apparatus for calibrating gain of an radio frequency receiver ("Rx") is disclosed to provide, among other things, a structure for performing in-situ gain calibration of an RF integrated circuit over time and/or over temperature without removing the RF integrated circuit from its operational configuration, especially when the gain of the RF integrated circuit is susceptible to variations in process, such as inherent with the CMOS process. In one embodiment, an exemplary apparatus includes a thermal noise generator configured to generate thermal noise as a calibrating signal into an input of an Rx path of an RF integrated circuit. The apparatus also includes a calibrator configured to first measure an output signal from an output of the Rx path, and then adjust a gain of the Rx path based on the thermal noise. In one embodiment, the thermal noise generator further includes a termination resistance and/or impedance.

3 Claims, 7 Drawing Sheets

OTHER PUBLICATIONS

Le, Office Action issued to U.S. Appl. No. 11/132,509, Mar. 5, 2008, 9 pgs.
Shah, Office Action issued to U.S. Appl. No. 12/173,166, Jul. 18, 2011, 12 pgs.
Taiwan Patent Office, Office Action issued to Taiwan Application No. 095117473, Nov. 27, 2009, 3 pgs.
Yang, Office Action issued to European Application No. 06010272.0, Jun. 5, 2009, 6 pgs.
Yang, Office Action issued to European Application No. 06010272.0, Aug. 10, 2010, 4 pgs.

* cited by examiner

| Source | Error contribution |
|---|---|
| P(TNS) | ±0.4dB |
| NF (Rx) | ±2dB |
| Bandwidth | ±0.7dB |
| Clipping or ADC noise floor | ±0.2dB |
| Power estimator | ±0.4dB |
| Total | ±3.7dB |

US 8,428,194 B2

IN-SITU GAIN CALIBRATION OF RADIO FREQUENCY DEVICES USING THERMAL NOISE

CROSS REFERENCE TO RELATED APPLICATION

This application is a divisional application of U.S. patent application Ser. No. 12/173,166, filed Jul. 15, 2008, which is a divisional application of U.S. patent application Ser. No. 11/132,509, filed May 18, 2005, which applications are hereby incorporated by reference.

BACKGROUND OF THE INVENTION

This invention relates generally to wireless communications, and more particularly, to performing in-situ calibration of a gain for a radio frequency ("RF") radio receiver ("Rx") using, for example, thermal noise as a calibrating signal.

Bipolar and Bipolar Complementary Metal Oxide Semiconductor ("BiCMOS") are examples of processing technologies used to manufacture RF integrated circuits ("ICs") that include RF receivers. Although these technologies provide for a relatively stable amplifier gain for an RF receiver over process, voltage and temperature ("PVT"), they are complex and expensive. Complementary Metal Oxide Semiconductor ("CMOS") processing technology, which is simpler and less costly, has been implemented to avoid the complexities and costs of those technologies to manufacture RF ICs. But gains of RF receivers built in CMOS are not as stable as the above-mentioned technologies over PVT, thereby leading to large variations in amplifier gain. Consequently, the amplifier gain of a CMOS-based RF IC must be calibrated to ensure proper operation of the RF receiver.

FIG. 1 is a conventional system 100 for calibrating an amplifier gain for an RF IC 106. In this example, RF IC 106 is mounted on a substrate, such as a circuit board 104, as is a memory 110 and other ICs (not shown). To calibrate the gain of RF IC 106, system 100 includes a signal generator 112 connected to an antenna port 103 for providing a calibration signal 105 with which to determine the gain. Antenna port 103 is designed to receive antenna 102 after calibration. System 100 also includes a tester 108, which can be a computing device, for testing the gain of RF IC 106. Tester 108 receives an output signal 107 from RF IC 106 and then measures the gain with respect to calibration signal 105. If the gain deviates from a desired value, tester 108 generates calibration parameters for use by RF IC 106 to set the gain to a desired value. Tester 108 then stores these calibration parameters in memory 110, which is typically a programmable read-only memory such as an EEPROM. While functional, conventional communication RF IC calibration systems such as system 100 have several drawbacks. For example, system 100 is configured to calibrate amplifier gain at production and not in the field under normal operating conditions. The step of calibrating the gain during production is associated with increased costs and test times. Further, this calibration occurs usually once; calibration is not performed post-production. Other drawbacks of the conventional calibration techniques are that the initial calibration parameters do not generally account for either excursions in temperature or operational characteristics of the electrical components as those components age.

In view of the foregoing, it would be desirable to provide an improved calibration apparatus and technique that minimizes the above-mentioned drawbacks.

SUMMARY OF THE INVENTION

A system, apparatus, computer readable medium and method are disclosed to effectuate in-situ gain calibration of an radio receiver over time and/or over temperature without removing the RF IC from its operational configuration, especially when the gain of the RF IC is susceptible to variations in process, such as the CMOS process. Notably, the present invention provides an in-situ calibration signal generator that resides on the same substrate as does the RF IC. In one embodiment, the in-situ calibration signal generator generates thermal noise to calibrate the gain of an Rx path. According to a specific embodiment of the present invention, an exemplary apparatus includes a thermal noise generator configured to generate thermal noise as a calibrating signal into an input of an Rx path of an RF integrated circuit. The apparatus also includes a calibrator configured to first measure an output signal from an output of the Rx path, and then adjust a gain of the Rx path based on an estimated gain. In various embodiments, the estimated gain is a function of thermal noise, which can be an estimated amount of thermal noise power generated by a thermal noise source, "TNS"). In particular, the estimated gain can be a function of the measured thermal noise output (e.g., a measured output noise power signal value) from an Rx path and thermal noise (e.g., a thermally-generated input noise power signal value) being input into the Rx path. In one embodiment, the thermal noise generator further includes a termination resistance and/or impedance. The generated thermal noise is generally constant over frequencies useable by the RF integrated circuit. In another embodiment, the calibrator adjusts the gain by an amount derived from a noise figure ("NF") of the Rx path, with the noise figure being less susceptible to variations over process and/or temperature than is the gain. In yet another embodiment, the apparatus further includes a temperature sensor coupled to the calibrator for adjusting a value of the noise figure in accordance with a measured ambient temperature. This improves calibration accuracy. In still yet another embodiment, the calibrator is an in-situ calibrator and is configured to automatically calibrate the gain while the RF integrated circuit remains operational to communicate RF signals. In a specific embodiment, the calibrator further comprises a gain evaluator to determine a gain differential between a calculated gain that is based on the output signal and an expected gain, and a gain adjuster to adjust the gain of the Rx path by an amount equivalent to the gain differential. The Rx path includes receiver ("Rx") circuits, one of which is an adjustable amplifier that provides an adjustable amplifier gain for the Rx path. In operation, the gain adjuster provides a control signal to the adjustable amplifier so that the amplifier can adjust a measured gain to match a desired gain. The control signal, in whole or in part, includes data representing a gain differential (or delta) that is the difference between the measured gain (i.e., a calculated gain including an error) and the desired gain. An exemplary apparatus of the present invention is particularly beneficial in calibrating the gain of a radio receiver subsystem, especially when that subsystem is manufactured using CMOS processing technologies or other like processing technologies where gain varies significantly over process, voltage and/or temperature.

According to a specific embodiment of the present invention, an exemplary method calibrates a radio frequency ("RF") integrated circuit by first modeling an effective input noise power signal value using at least one noise figure ("NF") value associated with an RF radio receiver, the effective input noise power signal being modeled for input into the RF radio receiver. Then, the method measures an output noise power signal from the RF radio receiver to form a measured output noise power signal value. The method continues by calibrating a gain of the RF radio receiver as a function of the effective input noise power signal value and the measured output noise power signal value. In one embodiment, measuring the output noise power signal includes generating thermal noise, and applying the thermal noise as a calibrating signal into the RF radio receiver. Note that both generating thermal noise and applying the thermal noise are repeatable so that the method can perform in-situ calibration of the gain. In at least one embodiment, the method measures an ambient temperature to determine a measured temperature for improving calibration accuracy, and then modifies a value of the at least one noise figure to form a modified noise figure value, which is based on the measured temperature. In particular, the modified noise figure value is a noise figure value that compensates for the effects of temperature on noise figures, thereby providing a more robust noise figure value for estimating the gain. Further, the method can adjust the gain in accordance with the modified noise figure value.

In a specific embodiment, a system includes a radio receiver subsystem and a processor and is configured to calibrate the gain of a radio receiver ("Rx") path. The radio receiver subsystem includes a thermal noise source configured to provide a calibration signal, an Rx path, and one or more filters. Each of these can be modeled to provide parameter values, such as a thermal noise source value, an Rx path noise figure value, and an equivalent noise bandwidth for the one or more filters. The radio receiver subsystem can also include a gain adjuster to adjust a gain of the radio receiver subsystem. The processor is configured to communicate with a central processing unit ("CPU") of a networked computing device and has a gain calibrator, which includes a parameter generator to provide parameter values for deriving an effective input noise power signal value. The parameter values can include the thermal noise source value, the Rx path noise figure value, and/or the equivalent noise bandwidth. The processor can also include an output quantifier to measure an output noise power signal from the Rx path to form a measured output noise power signal value, as well as a gain evaluator to determine a gain differential between a calculated gain and an expected gain. The calculated gain can be a function of the measured output noise power signal value and the effective input noise power signal value. The gain differential can be passed to the gain adjuster for calibrating the gain. In a specific embodiment, the radio receiver is a constituent element of an RF integrated circuit manufactured using a complementary metal oxide semiconductor ("CMOS") processing technology. The processor is a base band processor including a medium access controller ("MAC") module for operating the system in a wireless local area network ("WLAN").

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF THE INVENTION

Figure 1:
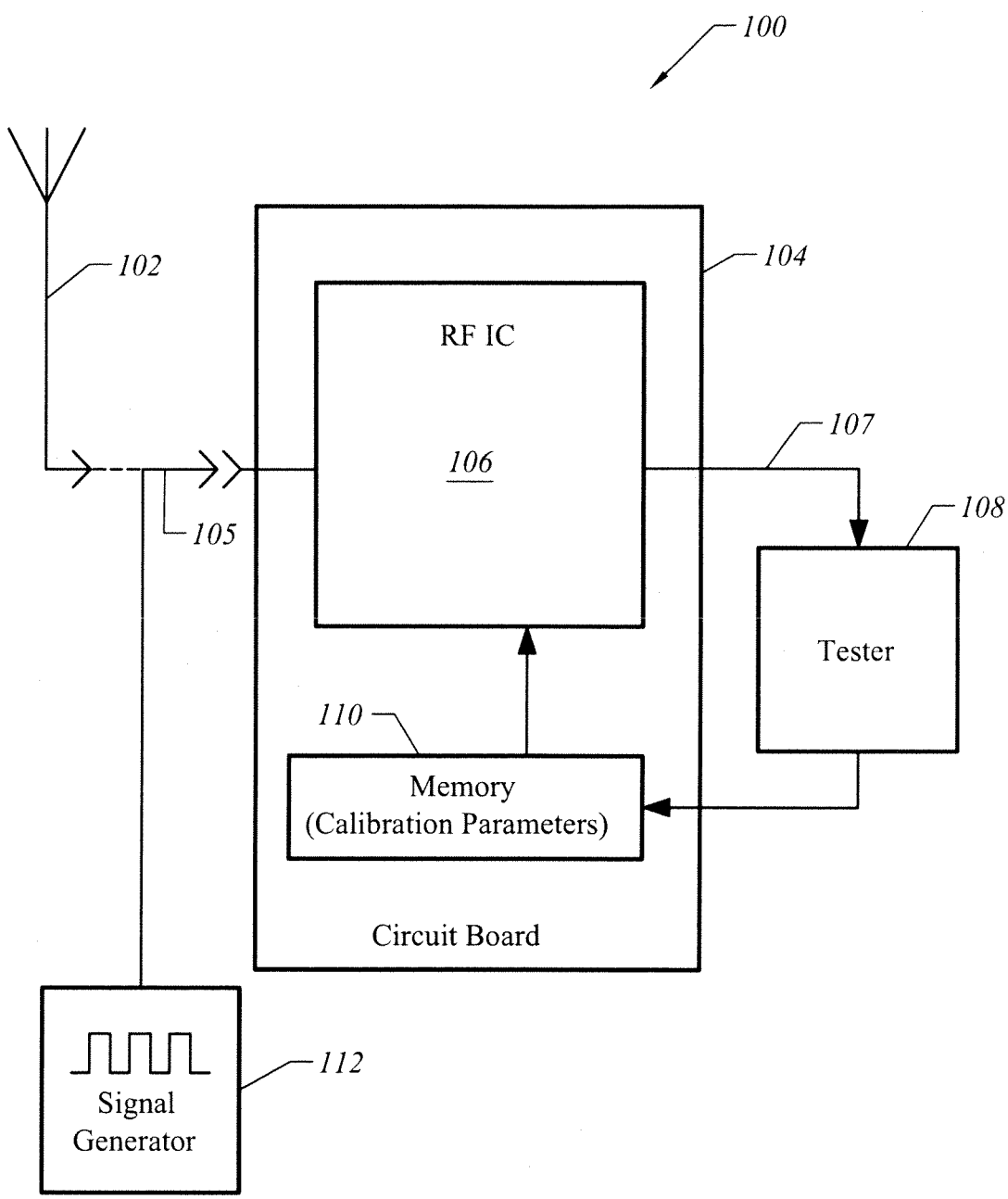
FIG. 1 is a conventional system for calibrating an amplifier gain for an RF integrated circuit.
Figure 2:
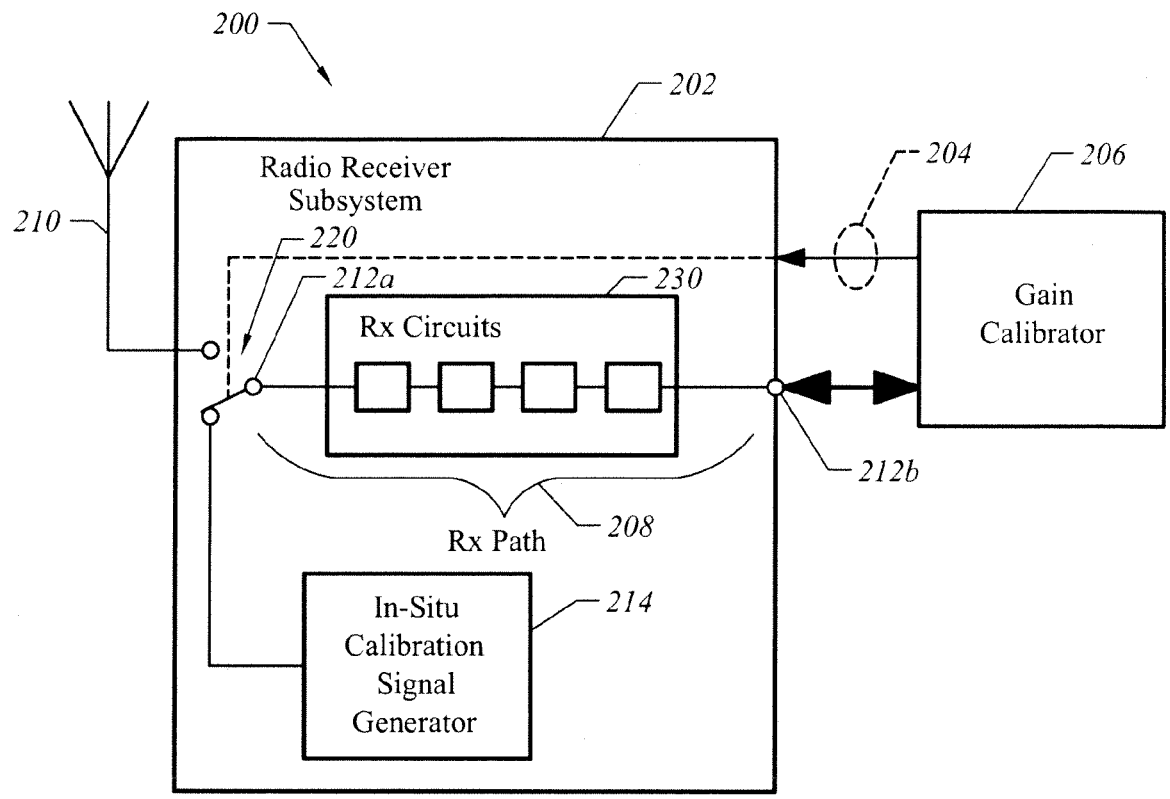
FIG. 2 is a block diagram illustrating an apparatus having at least two modes of operation, one of which is an in-situ calibration mode for calibrating the gain of an RF receiver in accordance with one embodiment of the present invention.

FIG. 2 is a block diagram illustrating an apparatus having at least two modes of operation, one of which is a mode for performing in-situ calibration of the gain of an RF receiver in accordance with one embodiment of the present invention. In this example, apparatus 200 is bi-modal in that it operates in one mode to receive communications as radio signals, such as those within the radio frequency ("RF") bands, and operates in another mode to perform in-situ calibration independent of external calibration signals.

Apparatus 200 includes receiver ("Rx") circuits 230 through which radio receiver amplification path ("Rx Path") 208 propagates radio signals in a first mode (i.e., "receiver mode"). Rx circuits 230 influence the signal propagation characteristics of Rx Path 208. Examples of "Rx" circuits 230 include amplifiers (e.g., such as a Low-Noise Amplifier, or "LNA"), mixers, filtering circuitry, such as an intermediate frequency ("IF") filter, analog-to-digital converters, base band circuitry and other known circuits suitable for implementing an RF receiver. In some embodiments, radio receiver subsystem 202 constitutes at least a portion of a radio frequency front end ("RFFE") that operates in the first mode as an RF transceiver device for transmitting and receiving wireless signals at frequencies of 800 MHz to 5.2 GHz, for example. In at least one specific embodiment, radio receiver subsystem 202 is formed on a single substrate as part of an RF IC.

Apparatus 200 also includes a gain calibrator 206 and an in-situ calibration signal generator 214, both of which are configured to calibrate the gain of radio receiver subsystem 202 in a second mode (i.e., "calibration mode"). A mode selector 220, which is conceptually shown in this example as a switch, selects a signal source for propagating signals over Rx path 208, the signal source being either antenna 210 or in-situ calibration signal generator 214. To calibrate a gain associated with radio receiver subsystem 202, in-situ calibration signal generator 214 generates and then injects an internally-generated signal, such as a thermal noise power signal, into an Rx path input 212a of Rx path 208. Although in-situ calibration signal generator 214 is configurable to generate various types of calibration signals, in at least one embodiment it generates a thermal noise power signal as a calibration signal. Since the calibration signal can be a thermal noise power signal in some embodiments, it therefore can be modeled to also include thermal noise generated by other electronic components (e.g., Rx circuits 230) of radio receiver subsystem 202. As such, the calibration signal can be modeled as an effective input noise power signal representing the total equivalent thermal noise characteristics associated with Rx path 208. In at least one embodiment, the effective input noise power signal is derived using at least one noise figure ("NF") value representative of Rx path 208 and power signal representative of the noise power generated by in-situ calibration signal generator 214. Noise figure values are well understood by those ordinarily skilled in the art and need not be discussed in greater detail.

During calibration mode, gain calibrator 206 first measures a thermally-generated noise power signal at an Rx path output 212b of Rx path 208. Then, it determines a gain for radio receiver subsystem 202 as a function of both the measured thermal noise power signal from Rx path output 212b and the effective input noise power signal value. After gain calibrator 206 calculates the gain, it then adjusts the gain of Rx path 208 via control line 204 to a desired gain value. In a specific embodiment, some of "Rx" circuits 230 that lie off Rx path 208 are neutralized or disabled to minimize internally-generated noise from interfering with calibration of radio receiver subsystem 202.

Advantageously, both the thermal noise power signal (as an calibration signal) and the NF value of Rx path 208 are reliably constant over variations in process as compared to the gain, and are predictable over temperature and voltage. As such, various embodiments of the present invention provide a localized calibration signal for in-situ gain calibration of an RF receiver so that gain calibration can be done "on the fly," thereby obviating requirements for either performing a one-time gain calibration during production or storing calibration parameters in a memory device. Accordingly, the gain of Rx path 208 can be calibrated to approximately its desired value of operation regardless of either excursions in temperature or changes in operational characteristics of aging electrical components. Further, in-situ calibration signal generator 214 can be implemented using one or more existing electronic components of radio receiver subsystem 202, and as such, does not require additional electrical components to generate a thermal noise power signal in accordance with embodiments of the present invention. Or, in-situ calibration signal generator 214 can be implemented as a dedicated calibration signal generator that is configured to generate non-thermally generated signals. In alternative embodiments, gain calibrator 206 can improve accuracy of gain calibration by resolving measurement errors during gain calibration and/or by factoring ambient temperatures into the gain calculation process.

An exemplary gain calibrator 206 is configured to determine a gain differential between a calculated gain and an expected gain and then adjust the gain of Rx path 208 by an amount equivalent to the gain differential. To determine the calculated gain, gain calibrator 206 quantifies (i.e., measures) an output noise power signal at Rx path output 212b. In accordance with a specific embodiment, gain calibrator 206 determines the calculated gain as follows in Equation (1), whereby the calculated gain is described as a function of both an output noise power signal value and the effective input noise power signal value:

$$G_{RX} = P_{mOUT}\text{dBm} - P_{effIN}\text{dBm}[\pm\text{delta dBm}], \quad \text{Equation (1)}$$

where G(RX) is the calculated gain, P(mOUT) is a quantified (i.e., measured) noise output power signal value, and P(effIN) is the effective input noise power signal value.

As is shown in Equation (1), "delta" can be optionally included as the cumulative error for estimated parameter values. A gain calibrator of the present invention can optionally use "delta" to ensure that the gain of an Rx path is adjusted within a range of gain values within +/−delta dBm from the desired gain. Without implementing calibrator 206 as well as the calibration techniques described herein, the gain of Rx path 208 can vary ±15 dB due to variations in process. This amount of fluctuation in gain is generally unacceptable for most radio receiver implementations. Calibrator 206 is configured to calibrate the gain within a delta of ±5 dB or less by deriving the effective input noise power signal value, P(effIN), from predictable parameter values that are relatively immune from significant variations in process. Some of these parameters are described next with respect to FIGS. 3 to 5. In one embodiment, gain calibrator 206 calculates or implements P(effIN) based on estimates for the following parameter values: an estimated amount of thermal noise power, P(TNS), as generated by a thermal noise source ("TNS"); a noise figure value ("NF(Rx path)") for Rx path 208; and an equivalent noise bandwidth value ("EQ_NBW") for filter 308.

Figure 3:
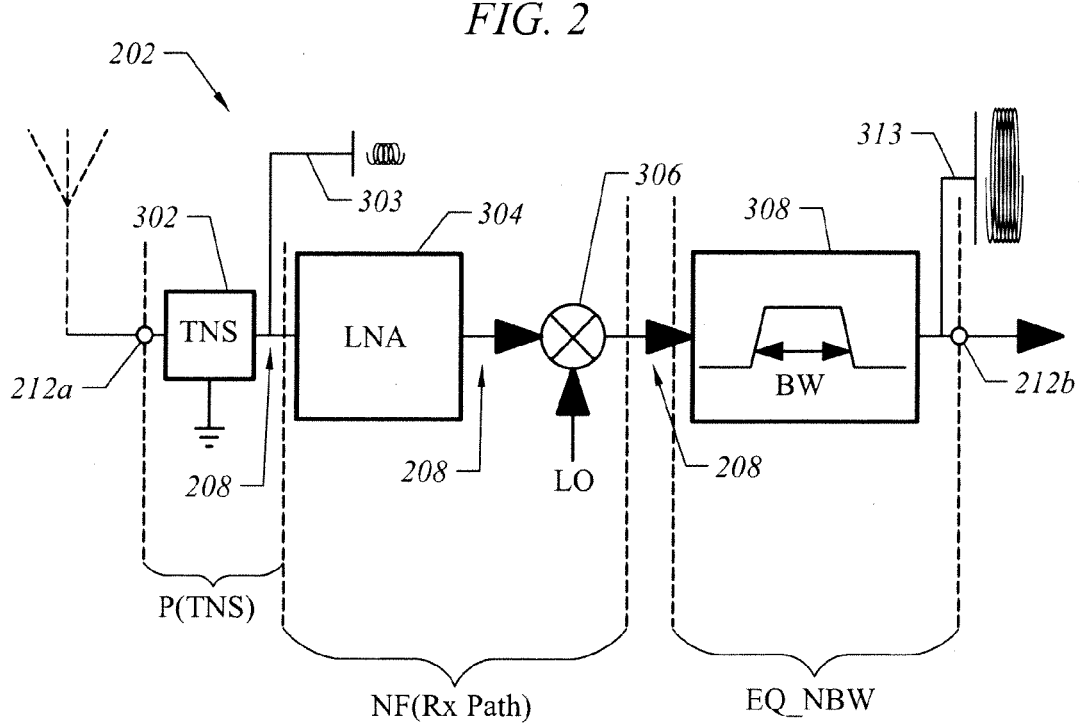
FIG. 3 is a block diagram of an equivalent circuit for a radio receiver subsystem modeled as having a noise figure ("NF") value, according to at least one embodiment of the present invention.

FIG. 3 is a block diagram of an equivalent circuit for a radio receiver subsystem modeled as having a noise figure ("NF") value, in accordance with an embodiment of the present invention. Radio receiver subsystem 202 is shown to include a thermal noise source ("TNS") 302 configured to generate an input thermal noise signal 303, which is the first parameter to be modeled and included in the determination of P(effIN). TNS 302 generates thermal noise power due to the random motion of free electrons and is generally constant throughout most of the frequency spectrum. The thermal noise power can be estimated by the following Equation (2):

$$P_{TNS} = 10\log(kT) = 10\log(kT_0 T/T_0) = -174 + 10\log(T/T_0), \quad \text{Equation (2)}$$

where P(TNS) represents an estimated thermal noise power expressed in units of dBm/Hz, k is Boltzmann's constant, and $T_0$ is 300 degrees Kelvin. In one embodiment, thermal noise source 302 is implemented as an existing electronic component of radio receiver subsystem 202, such as a 50-ohm termination resistance. Such a resistance typically forms part of a filter, such as a front-end receiver band filter that precedes a low noise amplifier ("LNA"). As such, TNS 302 can be modeled as a noise source generating an amount of thermal noise power, P(TNS).

The second parameter used to calculate P(effIN) is a noise figure for Rx path 208, or NF(Rx path). When calibrating Rx Path 208, input thermal noise signal 303 passes through a low noise amplifier ("LNA") 304 to mixer 306, which is driven by a local oscillator ("LO"). These and other constituent components (not shown) of radio receiver subsystem 202 collectively produce thermal noise that is added to signals passing through Rx path 208, thereby degrading the input signal-to-noise ratio. The noise figure for RX path 208, NF(Rx path), is a measure of this degradation. As the design and circuit layout of radio receiver subsystem 202 primarily influences the value of NF(Rx path), noise figure values are relatively stable (i.e., small deviations among NF values) over variations in process, voltage and temperature as compared to the gain of Rx path 208, which can vary +/−15 dB from RF IC to RF IC manufactured on the same process. In practice, NF(Rx path) values can be determined in any number of ways, one of which includes performing noise simulation using software models of radio receiver subsystem 202. In one embodiment, a NF(Rx path) value is determined empirically by measuring the noise figure for Rx path 208 over a number of electronic devices implementing radio receiver subsystem 202 to form an estimated NF(Rx path) value as a second parameter.

The third parameter used to calculate P(effIN) is the equivalent noise bandwidth value ("EQ_NBW") of one or more filters 308. After the input noise power signal is amplified by LNA 304, it is then band limited as it passes one or more filters 308, examples of which include an IF filter (e.g., a Surface Acoustic Wave, or "SAW," filter) and/or a base band filter (e.g., a low pass filter, or "LPF"). Thereafter, the output of radio receiver subsystem 202 is depicted as an output noise power signal 313 having a value representing an amplification of the input by a gain factor. In a specific embodiment of the present invention, the EQ_NBW is estimated by the following Equation (3):

$$EQ\_NBW=10\log(BW), \quad \text{Equation (3)}$$

where EQ_NBW is expressed in Hz and depends on the operational bandwidth of Rx path 208. So in view of the foregoing, an effective calibration signal P(effIN) of Equation (1) can be determined by the following Equation (4):

$$P(\textit{effIN})=[P(TNS)]+[NF(Rx\ path)]+[EQ\_NBW], \quad \text{Equation (4)}$$

where P(TNS), NF(Rx path), and EQ_NBW are estimated parameter values, according to a specific embodiment. Accordingly, Equation (4) represents a calibration signal modeled as an input into Rx path input 212a (FIG. 3) and useable, in whole or in part, for calibrating the gain of Rx path 208, according to embodiments of the present invention. Examples of these estimated parameter values are −174 dBm/Hz for P(TNS), 7 dB for NF(Rx Path), and 73 dB for EQ_NBW.

Gain calibrator 206 uses the following Equation (5) to determine "delta" for Equation (1) as a collective tolerance, which is due to error contributions associated with the estimated parameter values:

$$\text{delta}=\Delta P(TNS)+\Delta NF(Rx\ Path)+10\log(1+\Delta BW/BW), \quad \text{Equation (5)}$$

where $\Delta P(TNS)$ is an amount of error due to fluctuations in ambient operational temperature, $\Delta NF(Rx\ path)$ is an amount of error due to fluctuations in PVT (i.e., process, voltage, and temperature), and $\Delta BW$ is due to band limiting radio receiver subsystem 202 to an operational bandwidth. Equation (2) determines $\Delta P(TNS)$ to be about ±0.4 dB, given that T0 is presumed equal to 300 degrees Kelvin and the ambient temperatures during operation are limited to a range from 0° C. to 65° C., according to one embodiment. $\Delta NF(Rx\ path)$ typically varies by ±2 dB over various designs of radio receiver subsystem 202, the value of which can be determined empirically or by simulation. Equation (3) estimates that $\Delta BW$ (i.e., $\Delta EQ\_NBW$) to be less than ±1.0 dB (e.g., ±0.7 dB), if filter 308 is bandwidth limited to about 20 MHz as an example. Note that in some embodiments, $\Delta P(TNS)$ and $\Delta NF(Rx\ path)$ can be temperature compensated (i.e., modified in accordance with an ambient temperature) to reduce the magnitudes of errors due to fluctuations in ambient operational temperature and an amount of error due to fluctuations in the temperature component of PVT.

Referring back to FIG. 2, gain calibrator 206 is configured to determine a calculated gain, G(RX), in accordance with Equation (1). By using Equations (4) and (5) to determine an effective input noise power signal value, P(effIN), and a delta value, respectively, gain calibrator 206 can formulate G(RX) given a quantified (or measured) noise output power signal value, P(mOUT). Thereafter, a gain differential ("Δgain") can be formed as described in the following Equation (6) to adjust the calculated gain to a desired value:

$$\Delta\text{gain}=G(RX)-G(\text{desired}), \quad \text{Equation (6)}$$

where G(desired) is the desired gain to which the gain of Rx path 208 is adjusted. The desired gain, G(desired), can be user-defined.

Figure 4:
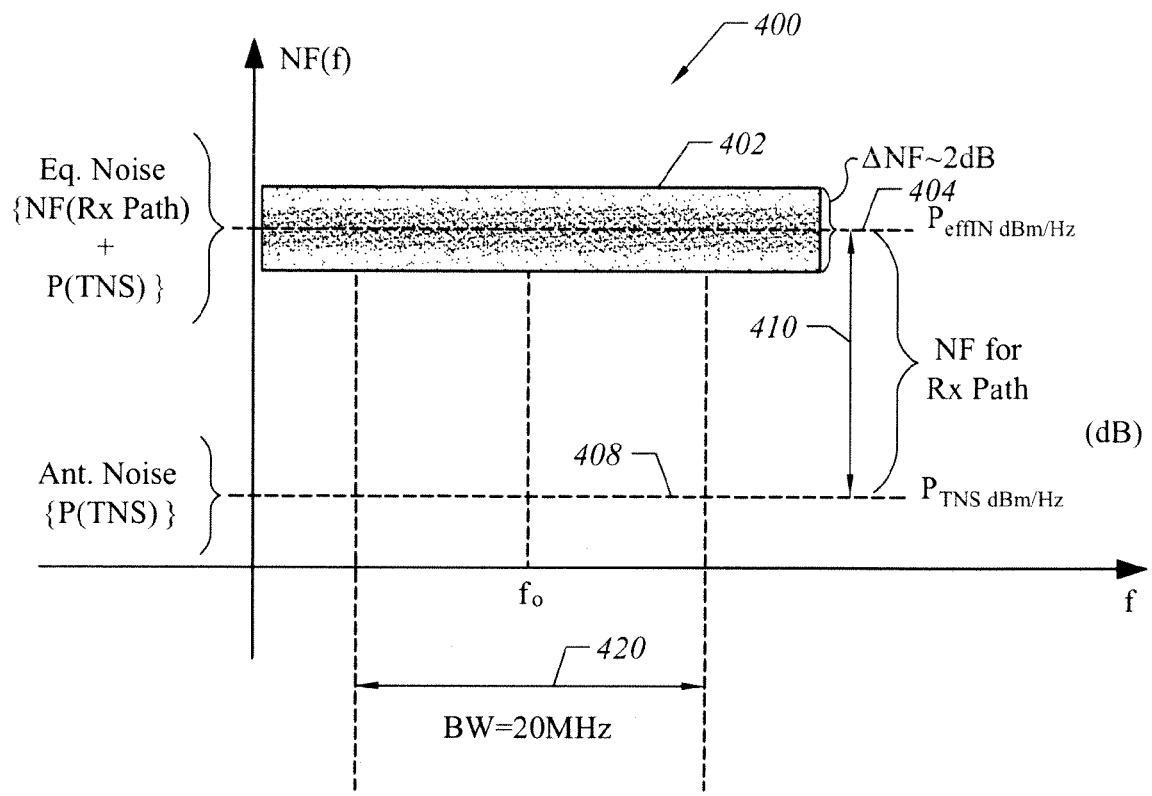
FIG. 4 is a graphical representation of a noise figure in relation to frequency ("NF(f)") and depicts values for an effective input noise power signal as a calibration signal according to an embodiment of the present invention.
Figure 5:
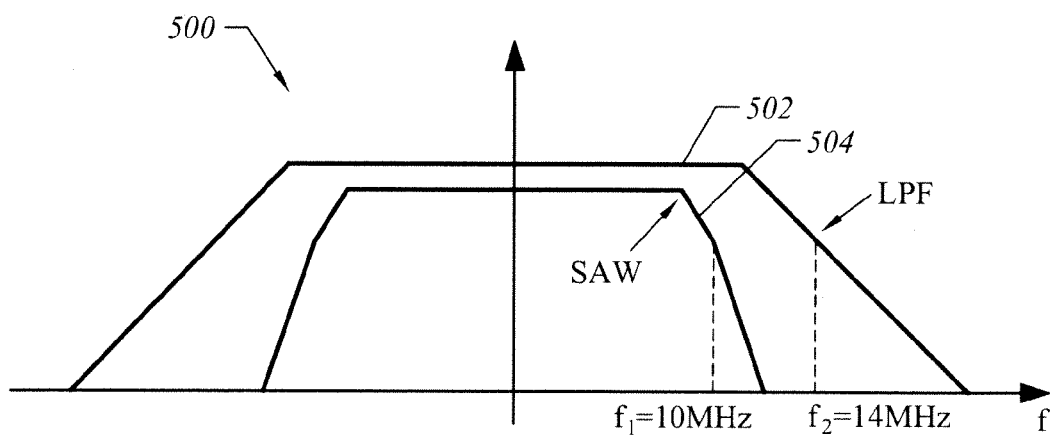
FIG. 5 is a graph depicting exemplary filter characteristics over frequency that are suitable for implementing a filter of FIG. 3, according to at least one embodiment of the present invention.

FIG. 4 is a graphical representation of a noise figure in relation to frequency ("NF(f)") and depicts values for an effective input noise power signal, P(effIN), as an effective calibration signal in according to an embodiment of the present invention. NF(f) 400 shows that thermal noise generated by an exemplary thermal noise source at or near an antenna (i.e., input into an Rx Path) of a RF radio receiver has a noise figure value 408 over most frequencies, with that value being represented by P(TNS) in dBm/Hz. An additional amount of noise 410 (e.g., ~7 dB) is added to signals as they propagate through the RF radio receiver and therefore describes a noise figure for the Rx path in dB. Accordingly, an effective noise power signal 404 having a value of P(effIN) in dBm/Hz can be established as an input signal for determining the gain of an RF receiver path. Although NF(f) includes a margin of error 402 for P(effIN), such as ~2 dB, the value shown for P(effIN) is not band limited in accordance with Equation (3). For illustration purposes, the Rx path in this example is band limited to bandwidth 420, which is shown as being a bandwidth of 20 MHz centered at frequency, f0. FIG. 5 is a graph 500 depicting exemplary filter characteristics over frequency that are suitable for implementing filter 308 (FIG. 3). In particular, filer 308 can exhibit filter characteristics 502 if such a filter were a base band filter (e.g., low pass filter, or "LPF"). Or, filter 308 can exhibit filter characteristics 505 if such a filter were an IF filter (e.g., a Surface Acoustic Wave, or "SAW," filter).

Figure 6:
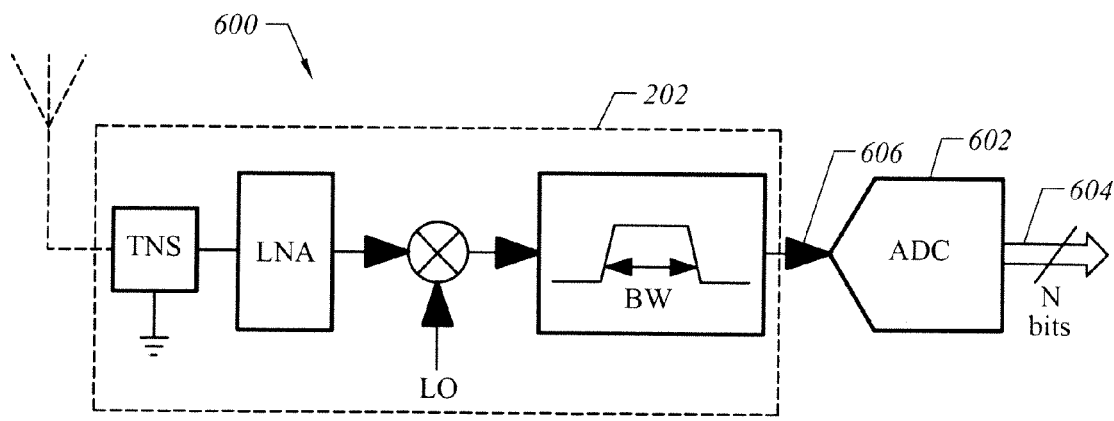
FIG. 6 is a block diagram of an RF radio subsystem including an analog-to-digital ("A-to-D") converter for converting base band analog signals into quantized words of "N" bits, according to one embodiment of the present invention.

FIGS. 6 to 10 describe various embodiments of the present invention in which a gain calibrator is configured to mitigate measurement errors during gain calibration. FIG. 6 is a block diagram 600 of an RF radio subsystem including an analog-to-digital ("A-to-D") converter 602 for converting base band analog signals into quantized words at output 604 of "N" bits wide, which can be 10 bits wide for example. During calibration, a noise power signal is applied to input 606 of A-to-D converter 602. Conversion errors inherent to A-to-D converter 602 are estimated, and are used to improve the accuracy of gain calibration during the measurements of the noise output power signal, according to an embodiment of the present invention. Specifically, gain calibrator 206 (FIG. 2) can be configured to account for clipping errors, quantization noise and sample sizes during A-to-D conversion.

Figure 7:
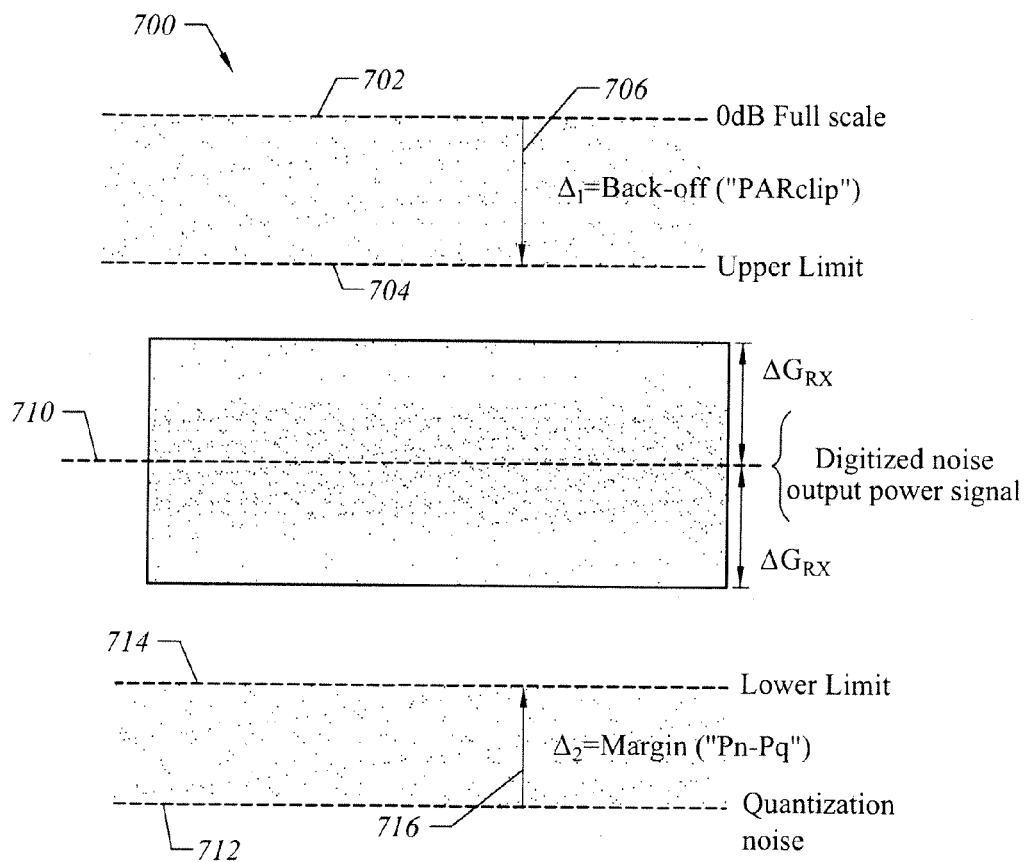
FIG. 7 depicts a window of operation for an A-to-D converter during gain calibration, whereby the window ameliorates measurement errors in accordance with a specific embodiment of the present invention.

FIG. 7 depicts a window of operation for an A-to-D converter during gain calibration, whereby the window ameliorates measurement errors in accordance with a specific embodiment of the present invention. A-to-D converter 602 has a dynamic range of operation defined between a full-scale level of operation 702 at the upper end and a quantization noise floor 712 at the lower end. A digitized noise output power signal at output 604 (FIG. 6) should be below an upper limit 704 to avoid clipping, but should be robust enough to minimize the effects of quantization noise in determining a calculated gain. Both clipping and quantization noise errors are due to noise affecting the A-to-D conversion process. Ideally, a noise power signal at input 606 should operate about a digitized noise output power signal level 710 (e.g., by an amount of $+/-\Delta G(RX)$) to ensure the digitized output noise power signal at output 604 is not subject to intolerable measurement errors that otherwise would hamper accurate gain calibration. An amount of "back-off" 706 for determining upper limit 704 and an amount of "margin" 716 for setting lower limit 714 are respectively described in FIGS. 8 and 9.

Figure 8:
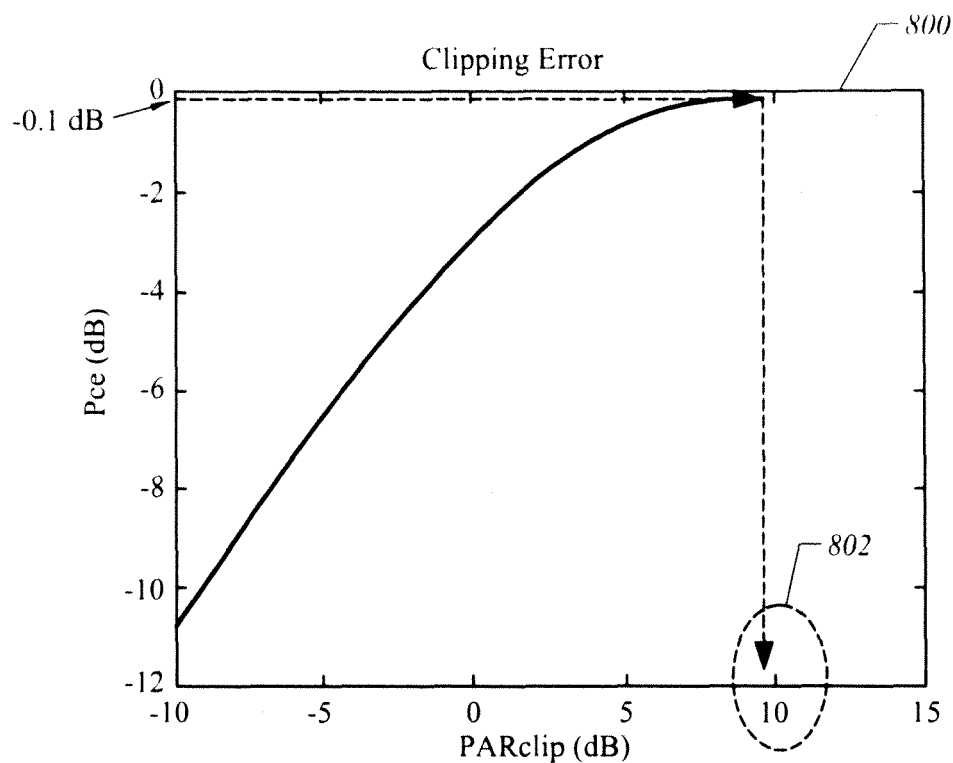
FIG. 8 is a graph depicting an exemplary relationship between an estimated error ("Pc") due to clipping of the noise power signal and a peak-to-average ratio ("PARclip") in accordance with a specific embodiment of the present invention.

FIG. 8 is a graph 800 depicting an exemplary relationship between an estimated clipping error ("Pce") due to clipping of the noise power signal at input 606 and a peak-to-average ratio ("PARclip") in accordance with a specific embodiment of the present invention. Note that $\Delta 1$ in FIG. 7 represents the peak-to-average ratio, or PARclip. FIG. 8 shows that values of Pce and PARclip are along the Y-axis and the X-axis, respectively. Consider that in this example, it is desired that an estimated error Pce is to be no greater than −0.1 dB, which is associated with 2% saturation. As shown, an estimated clipping error of −0.1 dB suggests a PARclip value 802 of about 10 dB, which is an amount necessary to back-off by PARclip, or by $\Delta 1$ in FIG. 7, from a full-scale level of operation for the specific value of Pce. For instance, upper limit 704 is determined by backing off or reducing the 0 dB full scale operational limit by PARclip value 802, which is $\Delta 1$.

Figure 9:
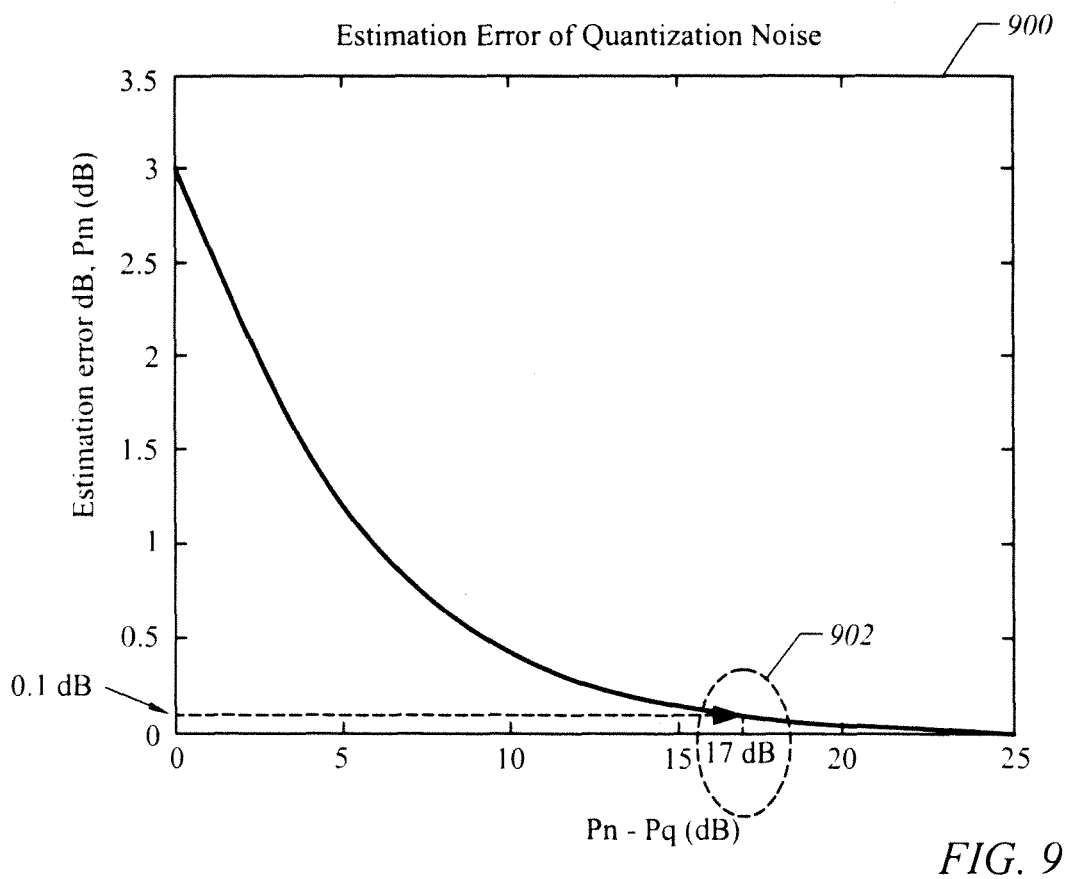
FIG. 9 is a graph depicting an exemplary relationship between an estimated error ("Pm") due to a margin between quantization noise, "Pq," and thermal noise power, "Pn," during the A-to-D conversion, according to an embodiment of the present invention.

FIG. 9 is a graph depicting an exemplary relationship between an estimated margin error ("Pm") due to a margin between quantization noise, "Pq," and thermal noise power, "Pn," during the A-to-D conversion, according an embodiment of the present invention. For example, Pm can be derived from the following Equation (7):

$$P_m = 10 \log(1+10^{-R/10}),$$ Equation (7)

where R is equivalent to the difference between values of Pn and Pq (i.e., R=Pn−Pq). Consider that in this example, it is desired that an estimated margin error, Pm, is to be no greater than 0.1 dB. As shown, an estimated margin error, Pm, of 0.1 dB suggests a "Pn−Pq" value 902 of about 17 dB. Note that the value 902 of "Pn−Pq" represents $\Delta 2$ in FIG. 7, where $\Delta 2$ is an amount necessary to provide a margin from between the noise power signal (i.e., the lower limit of FIG. 7), which is used to determine a calculated gain, and the quantization noise floor of the A-to-D converter. Note that both estimated errors Pce and Pm of FIGS. 8 and 9, respectively, can be determined either theoretically (e.g., predetermined or "on the fly") or empirically, or a combination thereof.

Figures 10, 11:
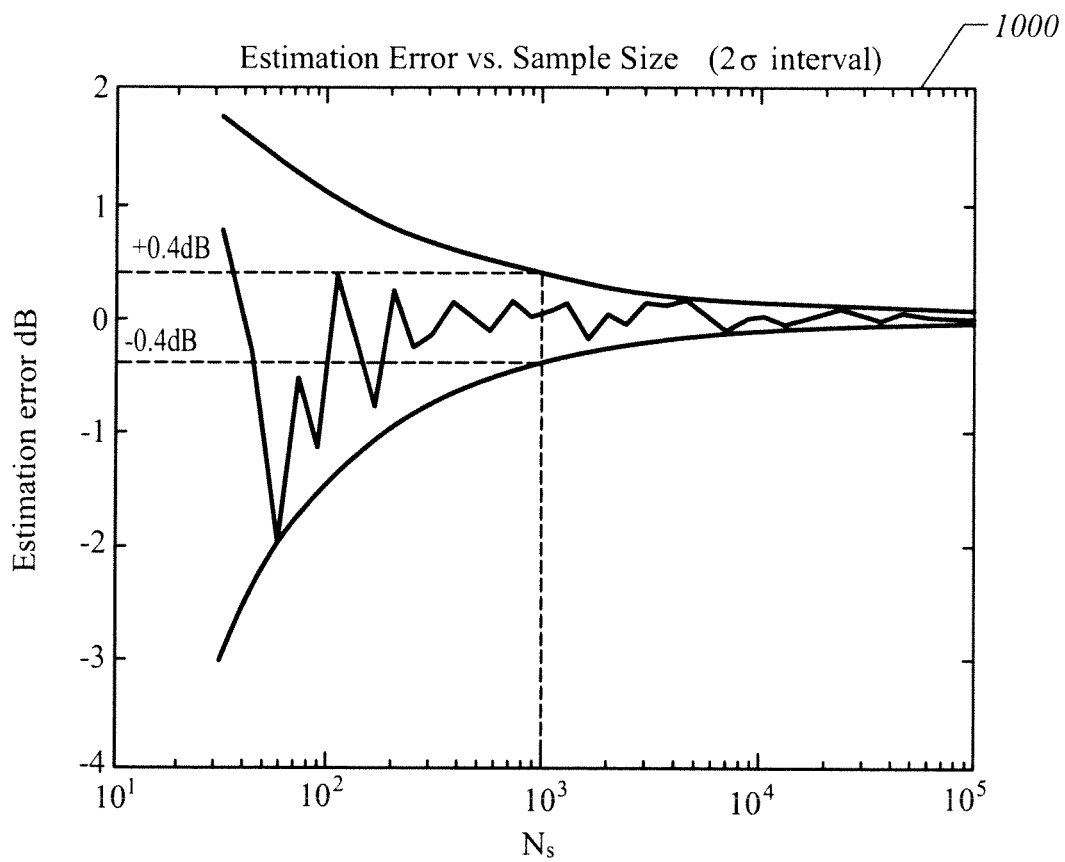
FIG. 10 is a graph depicting an exemplary relationship between an estimated error ("Pmeas") in quantifying (i.e., measuring) an output noise power signal due to selecting a certain amount of samples, Ns, for a particular sample size, according an embodiment of the present invention.
FIG. 11 shows a table of estimated tolerances used in gain calibration, according to various embodiments of the present invention.

FIG. 10 is a graph 1000 depicting an exemplary relationship between an estimated error ("Pmeas") in quantifying or measuring an output noise power signal due to an amount of samples, Ns, for a sample size, according an embodiment of the present invention. Consider first that a DC offset for the Rx path of the RF radio receiver has been calibrated prior to Rx path gain calibration. As such, a Gaussian noise signal generally will have no DC component, and as such, an estimate for the measured output noise power signal, P(mOUT), can be determined by the following Equation (8):

$$PmOUT = \frac{1}{N_s}\sum_{k=1}^{N_s} x_i^2,$$ Equation (8)

where the standard deviation of the measured (i.e., quantified) noise output power signal value, P(mOUT) can be determined by the following Equation (9):

$$\frac{std(\hat{P}_{no})}{P_{no}} = \sqrt{\frac{2}{N_s}}.$$ Equation (9)

Accordingly, if an estimation error "Pmeas" is desired to be less than ±0.4 dB with a two-sigma confidence interval, then the sample size, Ns, must be greater than 1000. Note that the determination of Pmeas described above relates to the time domain. In some embodiments, it may be advantageous to calculate Pmeas in the frequency domain using techniques of power spectral density estimation. Accordingly, a DC offset can be easily removed as it is at bin 0. Also, the variations in bandwidth are better controlled in terms of the accuracy of a crystal oscillator, thereby facilitating integration over a flat part of the power spectral density. Further, spurs (i.e., peaks of in the power spectral density) can be more readily excluded.

FIG. 11 shows a table of estimated tolerances that are used in gain calibration, according to various embodiments of the present invention. As shown, a collective tolerance of ±3.7 dB has been determined based on exemplary tolerances derived in the above description. A gain calibrator of FIG. 12 can be configured to uses these tolerances as well as their associated parameter values to determine a gain differential for adjusting the gain of an Rx path.

Figure 12:
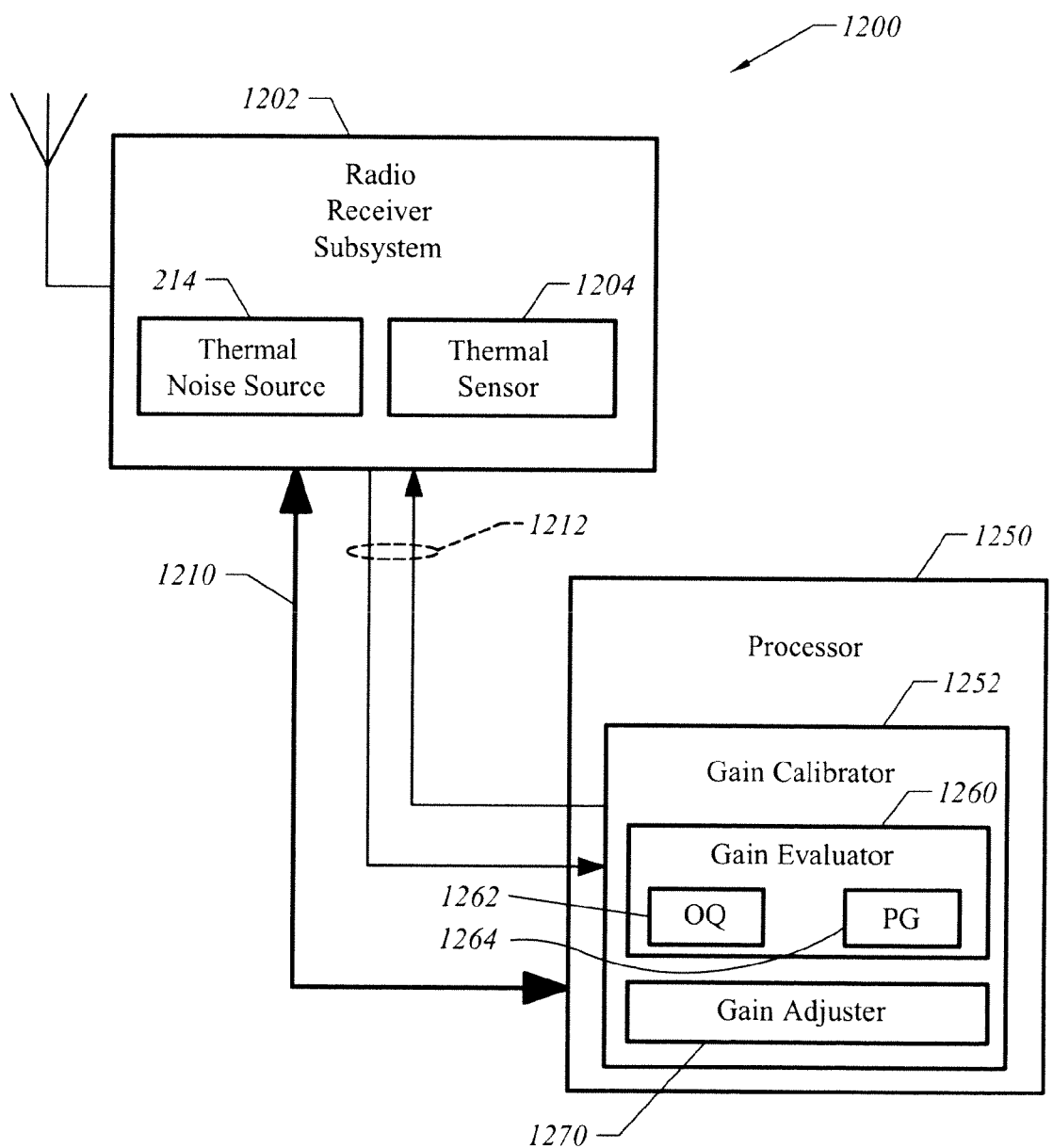
FIG. 12 is a block diagram depicting a system including a radio receiver subsystem and a processor that is configured to at least measure the output noise power signal for in-situ gain calibration, according to an embodiment of the present invention.

FIG. 12 is a block diagram depicting a system including a radio receiver subsystem and a processor that is configured to at least measure the output noise power signal for in-situ gain calibration, according to an embodiment of the present invention. System 1200 includes radio receiver subsystem 1202 having a thermal noise source 214 and an optional thermal sensor 1204 (e.g., on-chip). Thermal sensor 1204 can be implemented to calibrate out the variability of temperature effects on noise figures ("NFs"). As NFs are nearly linear functions of temperature over a range of temperatures, for example, from −20 to 85° C., then the accuracy of gain calibration in some embodiments can improve from 0.5 dB to 1 dB. In particular, when a noise figure can be correlated to variations in temperature, then by determining the temperature, the accuracy of the noise figure values can improve by any value from 0.5 to 1 dB. If the estimated amount of thermal noise power, P(TNS), also can be temperature-corrected (i.e., to include measured temperature), then the overall accuracy for a radio receiver subsystem can be further improved by any value from 0.8 dB to 1.3 dB.

System 1200 also includes a processor 1250 that contains an in-situ gain calibrator 1252. Although processor 1250 can be a central processing unit or any known computing device, processor 1250 in at least one specific embodiment is a single-chip baseband processor ("BBP") including a media-access-controller ("MAC") module and is configured to operate in wireless local area network ("WLAN") applications. As such, radio receiver subsystem 1202 is configurable to operate at least in a frequency range of 2.4-GHz to 5.2-GHz, as well as any other suitable frequencies. In some embodiments, processor 1250 is operable with any IEEE 802.11x standard or equivalent. Processor 1250 is coupled via data path 1210 to radio receiver subsystem 1202 for receiving at least a digitized output noise power signal from, for example, an output of an A-to-D converter. Processor 1250 also communicates control signals via control lines 1212 to manage the calibration process. For example, control lines 1212 can convey thermal data representing an ambient temperature for use by in-situ gain calibrator 1252.

While in-situ gain calibrator 1252 can be similar in operation and/or structure as in-situ gain calibrator 206 (FIG. 2), the one shown in FIG. 12 includes a gain evaluator 1260 and a gain adjuster 1270, both of which can be composed of hardware, software, or a combination thereof. Gain evaluator 1260 measures a thermal noise power signal via data path 1210 and then determines the gain for radio receiver subsystem 1202 as a function of the measured thermal noise power signal and at least an effective noise figure ("NF") value for the Rx path. After gain evaluator 1260 determines the gain, then gain adjuster 1270 adjusts the gain of the Rx path via control lines 1212 to a desired gain value when necessary. For instance, gain adjuster 1270 is configured to provide a control signal 1212 to an adjustable amplifier (not shown) in radio receiver subsystem 1202 so that the amplifier can adjust the measured gain to match the desired or expected gain. Control signal 1212, in whole or in part, includes data representing the gain differential (i.e., an amount of gain for adjusting the gain to an expected value) from a calculated gain (i.e., based on the measured gain that includes an error) to the desired gain.

In one embodiment, gain evaluator 1260 includes an output quantifier ("OQ") 1262 and a parameter generator ("PG") 1264. Output quantifier 1262 is configured, in whole or in part, to measure a value representing PmOUT, which is described above. In various embodiments, output quantifier 1262 measures the value representing PmOUT in a manner that minimizes measurement errors due to clipping errors, quantization noise, sample sizes of A-to-D converter 602, and the like. Specifically, output quantifier 1262 uses parameter values indicative of a "back-off" (or PARclip) value, a "margin" (or Pn-Pq) value and a sample size value to optimize the accuracy of gain calibration. Parameter generator ("PG") 1264 is configured generate other parameter values, such as P(TNS), NF(Rx Path), and EQ_NBW, as well as their tolerances, all of which are described above. Parameter generator ("PG") 1264 uses the parameters and tolerances (i.e., deltas) to form a value for P(effIN) in accordance with Equation (5). Then, gain evaluator 1260 uses a value for PmOUT from output quantifier 1262 and a value for P(effIN) from parameter generator ("PG") 1264 to generate a calculated gain, G(RX), in accordance with Equation (1). Then, gain adjuster 1270 can determine a value for Δgain in accordance with Equation (6), and then can use that value to adjust the amplifier gain. In at least one embodiment, in-situ gain calibrator 1252 calibrates the gain of an Rx path using Equations (1) and (6) within tolerances described above as "delta."

Note that the functionalities of gain calibrator 1252 need not be limited to processor 1250. In other embodiments, the various functionalities of the elements described in FIG. 12 can be distributed throughout system 1200, and beyond. For example, adjuster 1270 can reside in radio receiver subsystem 202. In other cases both in-situ gain calibrator 1252 and gain adjuster 1270 (or functional portions thereof) can be collocated within radio system 202. In at least one embodiment, radio receiver subsystem 1202 is manufactured in CMOS or other like semiconductor technologies where gain varies significantly over PVT. As system 1200 can perform in-situ gain calibration of its radio receiver subsystem, the gain of the Rx path can be calibrated to approximately its desired value of operation regardless of either excursions in temperature or changes in operational characteristics of aging electrical components. So if a computing device (such as a lap top, a mobile phone, or the like) implements system 1200, gain calibration of the present invention optimizes the operation of its wireless reception regardless of the range of temperatures (e.g., from the cold winters to hot summers) over which it operates.

An example of frequencies that the communication system of the present invention is suitable to transmit and receiver are those used in wireless LAN applications, which can be governed by IEEE standard 802.11. The present invention is applicable to a wide-range of frequencies. The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments related to an RF communications system, the discussion is applicable to all communications systems. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. A bi-modal radio receiver ("Rx") integrated circuit formed on a substrate and configured to operate in a receiver mode to receive radio communication signals and to operate in a calibration mode to perform in-situ gain calibration, the bi-modal radio Rx integrated circuit comprising:

an antenna port configured to receive radio communication signals from an antenna;

an in-situ calibration signal generator configured to internally generate a calibration signal;

a mode selector configured to select a signal source from either said antenna port or said in-situ calibration signal generator; and an amplification path including an amplifier having a gain that is adjustable, said amplification path coupled to said mode selector for amplifying radio communication signals in said receiver mode and for amplifying said calibration signal in said calibration mode, wherein said amplifier is configured to receive an adjustment signal representative of an amount to adjust said gain; and wherein said amplification path further comprises an analog-to-digital converter, whereby said adjustment signal is configured to modify said gain to minimize measurement errors due to said analog-to-digital converter including clipping errors, quantization noise floor errors, and estimation errors due to sample size.

2. The bi-modal radio Rx integrated circuit of claim 1 wherein said calibration signal is thermally generated and said amplifier is a radio frequency ("RF") amplifier.

3. The bi-modal radio Rx integrated circuit of claim 1 wherein said adjustment signal is based on a noise figure value of at least a portion of said amplification path.

* * * * *